US008745522B2

(12) United States Patent
Kalu et al.

(10) Patent No.: US 8,745,522 B2
(45) Date of Patent: Jun. 3, 2014

(54) ACTIONABLE MEDIA ITEMS (75) Inventors: Kalu Onuka Kalu, Waterloo (CA);
Tudor Coman, Ancaster (CA); Robert Andrew Connell, Ottawa (CA); Edward Chun Kei Chan, Waterloo (CA);
Shiladitya Sircar, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 423 days.

(21) Appl. No.: 12/963,361

(22) Filed: Dec. 8, 2010

(65) Prior Publication Data
US 2012/0079417 A1 Mar. 29, 2012

Related U.S. Application Data (60) Provisional application No. 61/386,814, filed on Sep. 27, 2010.

(51) Int. Cl.
*G06F 3/00* (2006.01)
(52) U.S. Cl.
USPC .......................................... 715/781; 715/814
(58) Field of Classification Search
USPC .................................. 715/781, 814
See application file for complete search history.

(56) References Cited

U.S. PATENT DOCUMENTS

| | | | | |
|---|---|---|---|---|
| 6,040,829 A * | 3/2000 | Croy et al. | ...................... | 715/864 |
| 6,731,312 B2 * | 5/2004 | Robbin | .......................... | 715/792 |
| 7,386,784 B2 * | 6/2008 | Capps et al. | .................. | 715/203 |
| 7,827,259 B2 * | 11/2010 | Heller et al. | ................... | 709/223 |
| 8,244,600 B2 * | 8/2012 | Gromek et al. | ............... | 705/27.2 |
| 2004/0268451 A1 * | 12/2004 | Robbin et al. | ......... | 999/999.999 |
| 2006/0294476 A1 * | 12/2006 | Buckley | ......................... | 715/781 |
| 2008/0301734 A1 * | 12/2008 | Goldeen et al. | .................. | 725/44 |
| 2008/0307363 A1 | 12/2008 | Jalon et al. | | |
| 2009/0063972 A1 | 3/2009 | Ma et al. | | |
| 2009/0172532 A1 | 7/2009 | Chaudhri | | |
| 2010/0036967 A1 * | 2/2010 | Caine et al. | .................... | 709/236 |
| 2010/0174993 A1 * | 7/2010 | Pennington et al. | .......... | 715/738 |
| 2011/0060666 A1 * | 3/2011 | Gromek et al. | ............... | 705/27.2 |

FOREIGN PATENT DOCUMENTS

WO  2009023591 A2  2/2009

OTHER PUBLICATIONS

Bassoli, Arianna et al.; "BluetunA: Music Sharing Through Mobile Phones"; 2 pgs.
Last.fm; "How Can I Listen to All the Music Then?"; Frequently Asked Questions; http://www.last.fm/help/faq?faqsearch=How+Can+l+listen+to+all+musci+then; Feb. 11, 2009, 1 pg.

(Continued)

*Primary Examiner* — Kieu Vu
*Assistant Examiner* — Andrew Chung
(74) *Attorney, Agent, or Firm* — Conley Rose, P.C.; J. Robert Brown, Jr.

(57) ABSTRACT

A user equipment (UE) and method are provided for displaying items associated with selected media content and to cycle such that multiple items are displayed over time. A UE is provided that includes at least one component configured to display a plurality of items provided in a filmstrip format and associated with a plurality of content and to cycle the items in the filmstrip format. A method therefore is also contemplated.

27 Claims, 9 Drawing Sheets (56) References Cited

OTHER PUBLICATIONS

Last.fm; "What Ways Are There to Listen to Music on Last.fm?"; Frequently Asked Questions; http://www.last.fm/help/faq?faqsearch=what+ways+are+there+to+listen+to+music+on+last.fm; Feb. 11, 2009, 2 pgs.

European Extended Search Report; Application No. 10194243.1; Apr. 10, 2012; 6 pages.

PCT International Search Report; Application No. PCT/CA2011/050601; Dec. 13, 2011; 3 pages.

PCT Written Opinion of the International Searching Authority; Application No. PCT/CA2011/050601; Dec. 13, 2011; 4 pages.

PCT International Preliminary Report on Patentability; Application No. PCT/CA2011/050601; Jan. 4, 2013; 10 pages.

\* cited by examiner

ACTIONABLE MEDIA ITEMS

CROSS-REFERENCE TO RELATED APPLICATIONS

The present application claims priority to U.S. Provisional Patent Application No. 61/386,814 filed Sep. 27, 2010, by Kalu Onuka Kalu, et al, entitled "Actionable Media Items in Software", which is incorporated by reference herein as if reproduced in its entirety.

BACKGROUND

As used herein, the terms "user equipment" and "UE" might in some cases refer to mobile devices such as mobile telephones, mobile devices, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communications session for a user. Also, the terms "user equipment," "UE," "user agent," "UA," "user device" and "user node" might be used synonymously herein.

Typically, media based applications, such as music/video software, provide media content on a UE based on a specific folder or file, an initial selection, and/or an initial action. The media content can be distributed and organized in some organizational structure of data, such a collection of files and/or folders. The entire collection of files and/or folders represents a hierarchical organization of content, such as in a folder tree. In some cases, some media content is initially displayed according to a selected folder in the folder tree, such as a folder of music albums or a folder for artists. Alternatively, the user can select a specific collection, group, or list of media content for display. For example, the user can select to display a self-edited playlist of media content, which can be linked to different files/folders in the folder tree. In other cases, the user performs an action on a content that causes a selection of some available media content. For example, the user can select a specific content file and based on his selection similar or related media content is displayed. In all the previous scenarios, the displayed media content corresponds to at least one folder that is filtered out or specifically selected from the folder tree.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more implementations of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for displaying and providing media content and/or applications from an entire collection of files and/or folders or a hierarchical organization of content, such as in a folder tree, automatically or by default without filtering or specific selection. The media content may comprise music content, video content, picture content, applications, programs, games, etc. that are organized and/or distributed in the entire collection of files and/or folders. Such content, or graphical representations thereof, may be displayed on a user interface in a moving or rolling filmstrip format, or other formats discussed herein. The content representations may be displayed in any visual format that shows or cycles the different content in turn, such as a changing sequence of pop-up or zoom-in windows.

Further, a user may perform an action on any of the displayed items to perform any one of a plurality of functions associated with a corresponding content. For example, the user may click on an item in the filmstrip to play the associated content locally, stream online, purchase, download, or rate a corresponding content. The user may also perform multiple actions for multiple displayed items to queue the corresponding media content and perform a plurality of functions associated with the media content in order as queued. Displaying a plurality of content automatically or by default from an entire collection of files and/or folders without filtering or specific selection by a user may improve user experience, for example, by providing access to more media choices. In some cases this displayed content may not have been selected or known to the user. Cycling the media content/applications in the filmstrip or other visual formats may also allow providers to promote their products and services to a user.

Figure 1:
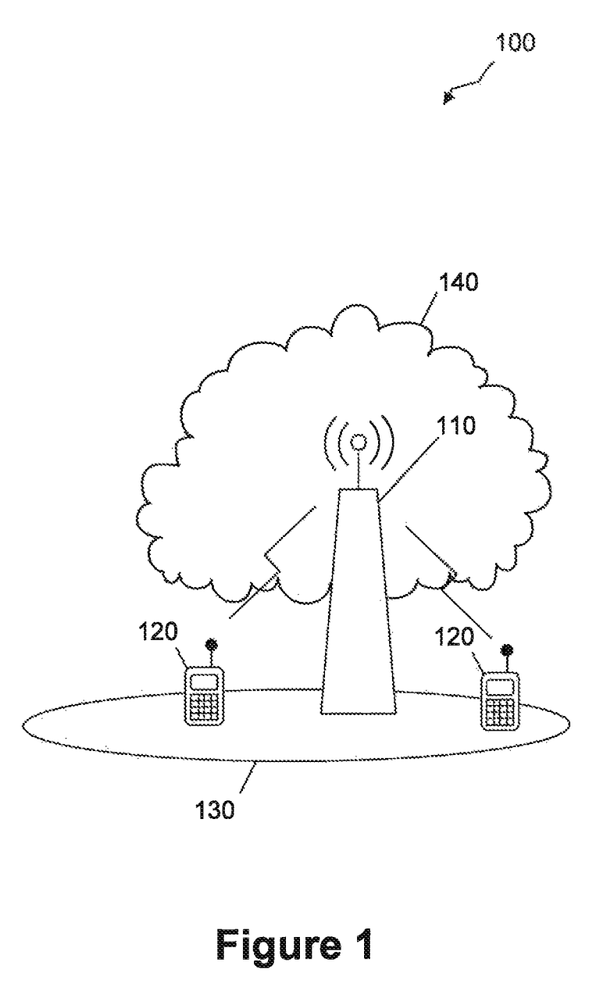
FIG. 1 is a schematic diagram of a communications system that allows a UE to communicate with other network components and/or devices according to an implementation of the disclosure.

FIG. 1 illustrates an implementation of a radio access network (RAN) 100 that may comprise at least one access device 110 and at least one UE 120, which may be both located within a cell 130. As used herein, the term "access device" refers to any component of the wireless network, such as a traditional base station, a wireless access point, or other device that creates a geographical area of reception and transmission coverage allowing a UE 120 or a relay node (not shown) to access or communicate with other components in a telecommunications system, such as second UE 120. The access device 110 may communicate with any UE 120 within the same cell 130, directly via a direct link. Alternatively, the access devices 110 may communicate with any UE 120 in the same cell 130 over shared links. In some implementations, the UEs 120 may communicate via a combination of wireless and wired networks.

In an implementation, the UE 120 may be configured to provide media content to a user, such as music, video, pictures, or other media. The UE 120 may also be configured to provide applications to the user, such as for emailing, scheduling tasks, word processing, Internet browsing, texting, chatting, gaming, etc. The media content may be stored on the UE 120 or may be obtained from or accessed remotely on a server, for instance via the access device 110 and the RAN 100. The media content may also be obtained from or accessed on an external storage device or medium that may be coupled to the UE 120 wirelessly (e.g. using WiFi or Bluetooth) or via a wire (e.g. a Universal Serial Bus (USB) cable).

The media content may be provided on the UE 120 via a user interface, such as the UE's display screen. Media content provided via the filmstrip format, for example, might be displayed from the home or default screen or user interface, such as at the top of a hierarchical structure, before any selections have been made by the user. Such media content may be displayed in the form of graphics and/or text provided in the filmstrip format, for example. The displayed content may be from randomly selected media content on the UE 120 or otherwise. For example, the displayed content may be collected from the entire collection of files/folders in the hierarchical organization of content and may be cycled over a time period. For example, the displayed content might be selected based on the file/folders most recently visited by the user. The displayed content may be automatically displayed on the screen, for instance in turn or some order. The content may be updated over time on the screen to allow the user to view more content than may be possible at one time, e.g. due to the limited screen size.

Additionally, the displayed content may include services available or products offered by a content or service provider. For instance, the content provider may be a movie studio that advertises movie releases, a music record company that advertises its albums, or a book publisher that advertises its books. The advertised content or items associated with such content may then be displayed on the UE 120, e.g. in the filmstrip format, and cycled with any other displayed content.

In another implementation, a plurality of items associated with a plurality of selected content may be displayed and provided on the UE 120 in a filmstrip format that cycles the items associated with content. Accordingly, the content may be determined by a user, such as by making a selection for a collection of content. For example, the user may select a folder or a plurality of folders or files that comprise the content to be displayed. The items associated with the entire content of the selected folder(s) or files may then be cycled in the filmstrip format in a reoccurring sequence. In one scenario, the items may be cycled in the filmstrip format until one of the items is selected. In another scenario, the items may begin to cycle in the filmstrip format after a period of inactivity on the UE. For example, if the user stops using the UE 120, the filmstrip may start cycling the items after some defined time period.

Figure 2:
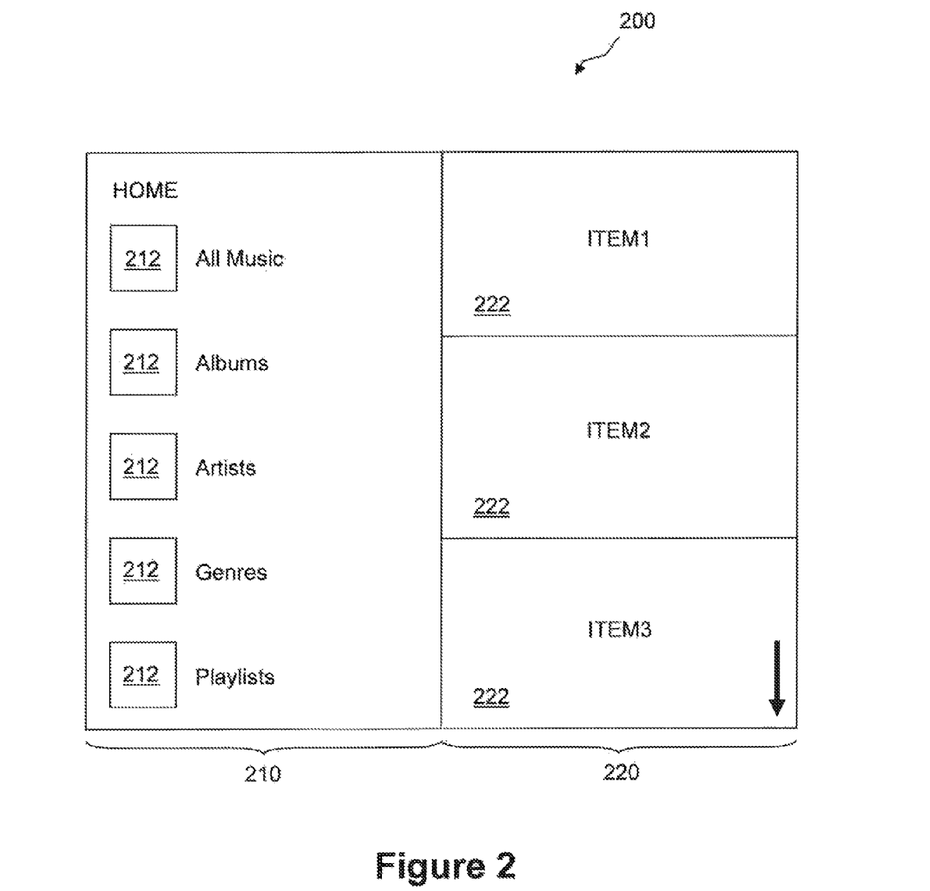
FIG. 2 illustrates an interface for displaying media content in a filmstrip according to an implementation of the disclosure.

FIG. 2 illustrates an implementation of an interface 200 for displaying media content in a filmstrip format. For instance, the interface 200 may displayed on a display screen of the UE 120. The interface 200 may comprise a home window section or view 210 and a filmstrip view 220. The home view 210 may list a plurality of hierarchies, such as specific folders, of media content, which may include "all music", "albums", "artists", "genres", "playlists", other selections, or combinations thereof. The hierarchies may be part of the hierarchical organization of content, e.g. the folder tree. Each hierarchy or folder may be represented by a text and/or a corresponding graphical representation 212, for example an icon, a logo, or a picture, in the home view 210. In another implementation, the "all music" hierarchy may represent the entire hierarchical organization of content that includes the remaining hierarchies, and as such may be referred to as the top hierarchy.

The filmstrip view 220 may display a plurality of content that may be available or accessible on the UE 120, associated with media content. The media content may be represented by a text and/or a corresponding item 222 displayed in the filmstrip view 220, such as an icon, a logo, or a picture, such as an image of an album cover or artist photograph, or other text or images associated with media content accessible by the UE 120. The items 222 may be updated on the screen over time by sliding or moving in the filmstrip view 220 downwards (as indicated by the arrow in FIG. 2) or upwards to allow other items 222 that correspond to other content to appear on the screen. Although the filmstrip view 220 is oriented in a vertical direction in FIG. 2, other implementations of the visual interface 200 may comprise a vertical filmstrip view 220, where the items 222 may slide or move to the right or left across the screen. The filmstrip might also be displayed diagonally. In other implementations, instead of the filmstrip view 220, the interface 200 may include another dynamic or changing view that displays and cycles the items 222, with or without the home view 210 simultaneously being displayed. For instance, the changing view may be displayed in any visual format that shows a changing sequence of items 222 in turn or some order, such as a plurality of reoccurring or simultaneously displayed items 222 provided in pop-up or zoom-in windows. For example, a pop-up window might be a window displaying one of the items 222 such that it covers all or part of the display screen. One or more items 222 might be displayed simultaneously, such as in a tile or other layout. A fade-in/out window might display the items 222 such that the items come into and out of view over a brief timer interval. Again the items 222 might be displayed in the format separately, or several items 222 might be displayed at a time.

Initially, the content may be displayed in the filmstrip view 220 (or other view) at the top hierarchy on the home screen or default view, for instance by randomly selecting media content and the associated items 222 for display in the filmstrip view 220. However, the user may subsequently select any of the hierarchies in the home view 210 to limit the displayed media content. In some cases, the top hierarchy may be configured or restricted by a user, as described below. However, in any of the implementations herein, the content may be displayed and cycled in the filmstrip view 220 automatically or by default without waiting for or receiving an input from the user to specify the displayed content.

Figure 3:
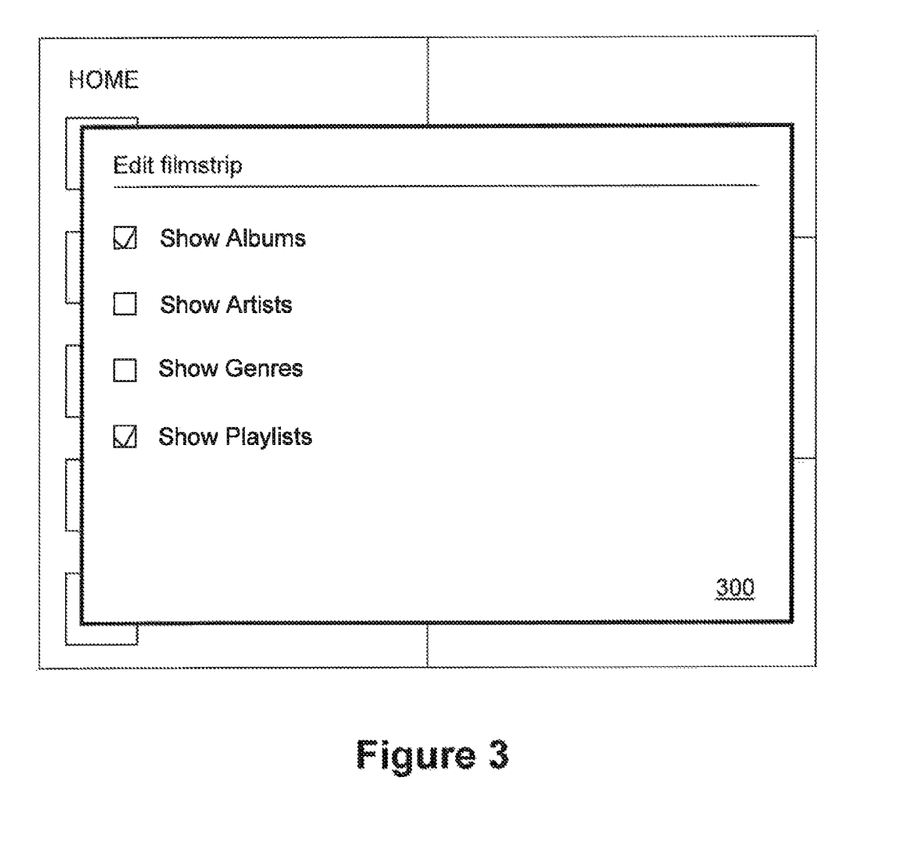
FIG. 3 illustrates an interface for editing a top hierarchy of media content in a filmstrip according to an implementation of the disclosure.

FIG. 3 illustrates an implementation for determining the content or associated items 222 that may be provided in the filmstrip view 220. Determining the content to be referenced in the filmstrip view 220 may be accomplished using an edit window or view 300, which may be opened or activated from the interface 200. For instance, the interface 200 may comprise a menu option or a button (not shown) that may be selected to open the edit view 300. The edit view 300 may list a plurality of hierarchies that may be part of the "all music" top hierarchy, including "albums", "artists", "genres", and/or "playlists". The user may select any of the hierarchies in the edit view 300 in order for the content under the particular hierarchy to be displayed in the filmstrip view 220. For example, as shown in FIG. 3, a user may check "albums" and "playlists" so that any content arranged under those folders is cycled through the filmstrip view 220. Alternatively, the user may check all the defined hierarchies or folders to show more media content at the top hierarchy in the filmstrip view 220. The items 222 displayed in the filmstrip view 220 may only correspond to those hierarchies selected by the user in the edit view 300.

The items 222 may also enable the user to perform functions associated with the corresponding content. As such, in response to a user action, any of the items 222 may provide some access to the associated content. For instance, the user may click on the items 222 to stream music or videos, purchase, download, play locally, or rate a corresponding content. If the item 222 corresponds to an application, the user may click on the item 222 to launch the application.

Figure 4:
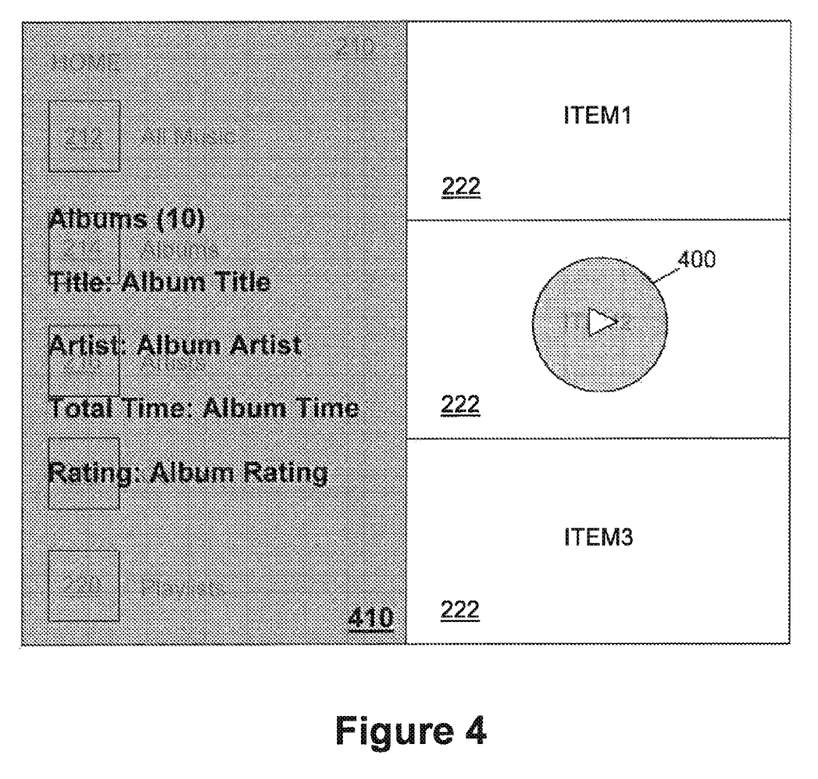
FIG. 4 illustrates an interface for streaming media content in a filmstrip according to an implementation of the disclosure.

FIG. 4 illustrates one implementation for streaming content using the filmstrip view 222. The content may be streamed using an item 222, for example to sample the content before purchase. The item 222 may initially show an album cover art (or other images or text) associated with a content. Subsequently, when a user moves a pointer over, touches, or clicks on the item 222, the item 222 in the filmstrip view 220 may be updated to show a streaming option 400. The home view 210 may not be displayed in favor of the a detailed information view 410. In an implementation, the streaming option 400 and/or the detailed information view 410 may be semi-transparent views that partially cover the displayed information which appears to be in the background, such as in the item 222 and/or the home view 210, as shown in FIG. 4.

The streaming option 400 may be an icon that indicates that the associated content is available for streaming online, such as for a music or video content. FIG. 4 shows a "play" sign icon in the streaming option 400, but any other sign or icon may be used. For example, the content may not be stored on the UE 120 but may be available for sampling at least once before purchase or download. Thus, the streaming option 400 may be activated, e.g. by a single click or a double click, to begin streaming the content, for example from an Internet server or a remote storage medium. The detailed information view 410 may list some detailed information about the associated content, such as which hierarchy or folder the media content belongs to, a title, associated artist(s), total time, rating, cost to purchase, or combinations thereof. For example, the content may be a song or a music album in an the "album" hierarchy that is available for streaming before purchase. Thus, the detailed information view 410 may indicate the album hierarchy and optionally the order of the music album in the album hierarchy, the album title, the album artists, the album total time, and/or the album rating.

In an implementation, the content may be available for streaming only once or a limited number of times, such as to limit the allowed content sampling times. If the content is streamed a maximum number times, then the content may not be streamed anymore and the streaming option 400 may not be shown. However, after reaching the maximum allowed streaming number, the content may become available for purchase.

Figure 5:
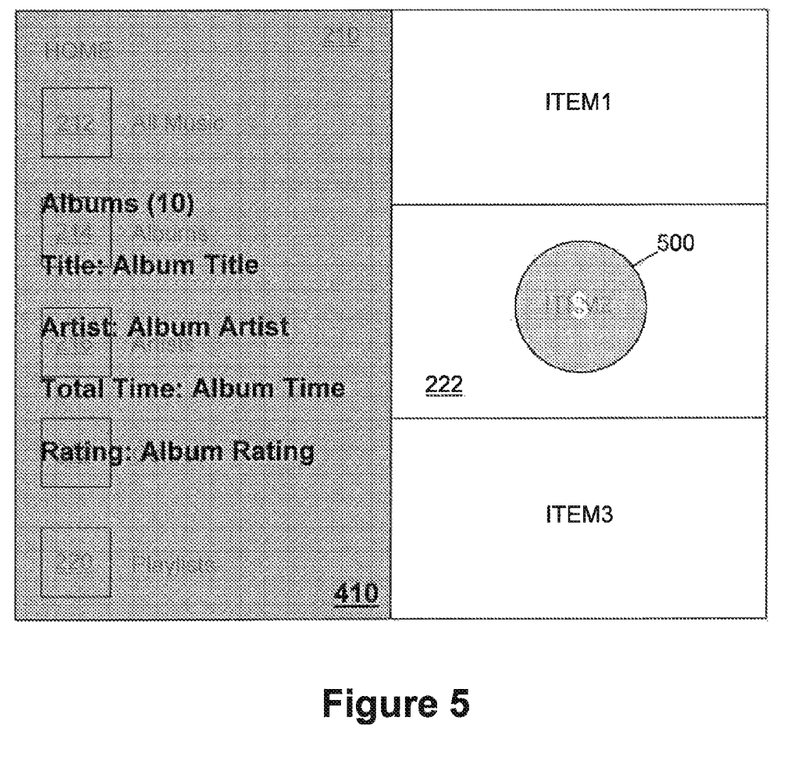
FIG. 5 illustrates an interface for purchasing media content in a filmstrip according to an implementation of the disclosure.

FIG. 5 illustrates one implementation for purchasing content in the filmstrip view 222, e.g. after streaming the content. The content may be purchased using the item 222 that corresponds to the media content. For instance, the item 222 that was used to stream the content FIG. 4 may be subsequently used in FIG. 5 to purchase the content. Accordingly, when a user moves a pointer over or clicks on the item 222, the item 222 may be updated to show a purchasing option 500. The home view 210 may also be updated to show the detailed information view 410.

The purchasing option 500 may be an icon that indicates that the associated content is available for purchasing. FIG. 5 shows a "dollar" sign icon in the purchasing option 500, but any other sign or icon may be used. The purchasing option 500 may be activated to begin a purchasing transaction. The purchase may be implemented by a selecting the purchasing option 500 to complete the purchase. After purchasing the content, the content may be available for download or further access and the purchasing option 500 may not be shown.

Figure 6:
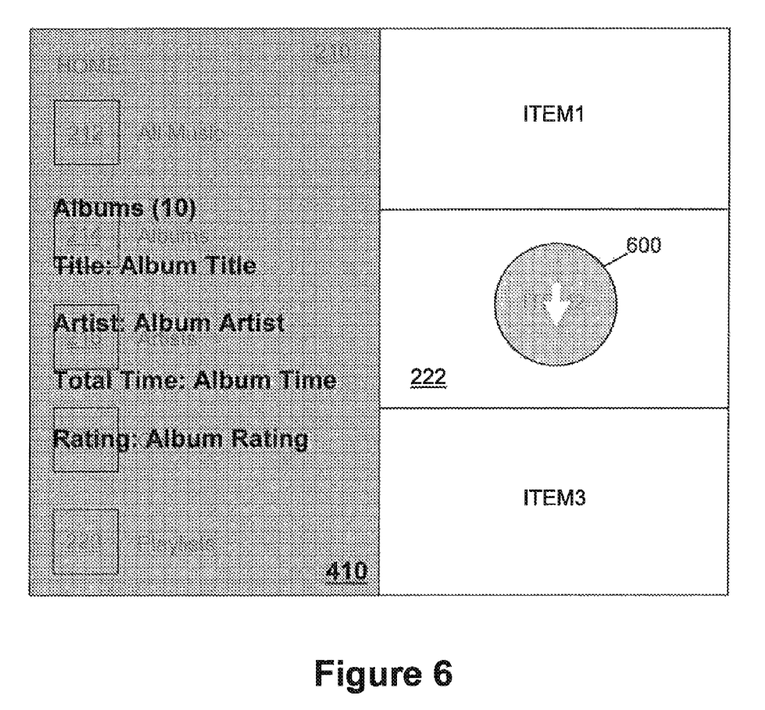
FIG. 6 illustrates an interface for downloading media content in a filmstrip according to an implementation of user disclosure.

FIG. 6 illustrates one implementation for downloading content in the filmstrip view 220, for example after purchasing the content. The content may be downloaded for the item 222 that corresponds to the content. For instance, a download option 600 might be displayed over the item 222 where the content was previously purchased. The home view 210 may also be updated to show the detailed information view 410, which might be updated to include information relevant to downloading the content.

The downloading option 600 may be an icon that indicates that the associated content is available for download. FIG. 6 shows a "downward arrow" sign icon in the purchasing option 500, but any other sign or icon may be used. The downloading option 600 may be activated to begin downloading the content, for example in a file format, on the UE 120. After downloading the content, the content may be stored on the UE 120 and played at any time or stored elsewhere for subsequent retrieval and the downloading option 600 may not be shown. Instead, a playing option may be shown and used to play the downloaded content.

Figure 7:
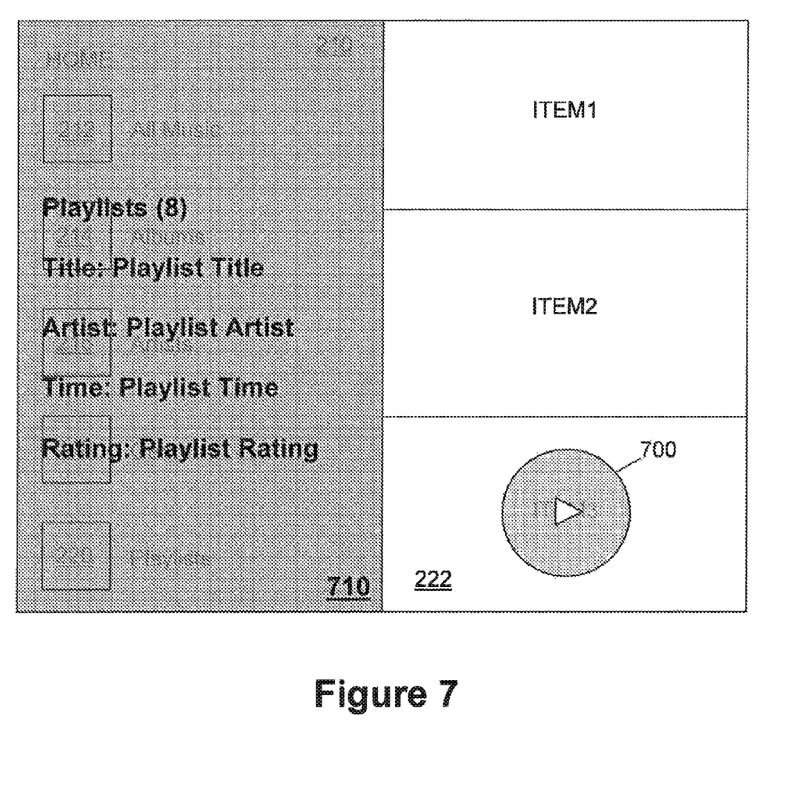
FIG. 7 illustrates an interface for playing media content in a filmstrip according to an implementation of the disclosure.

FIG. 7 illustrates one implementation for playing a content in the filmstrip view 220, e.g. after downloading the content. The item 222 may be updated to show a play option 700 when a user moves a pointer over or selects the item 222. The home view 210 may also be updated to show a detailed information view 710. The playing option 700 may be an icon that indicates that the associated content is available for playing locally or streamed to the UE 120. FIG. 7 shows a "play" sign icon as the play option 700, but any other sign, icon, or text may be used.

In some implementation, the items 222 may also be used for rating content. As such, an item 222 in the filmstrip view 220 may be updated to show a rating option, for example when the user moves a pointer over or clicks on the items 222. The rating option may be activated to begin rating the media content. Similarly, the items 222 may also be used to implement other functions associated with content, such as for sharing, recommending, or forwarding content.

Further, a plurality of content may be queued and displayed in a specified order. The content may have the same or different functions or options available. For example the functions may comprise any of the options above, such as for streaming, purchasing, downloading, playing, and/or rating the content, or other functions.

Figure 8:
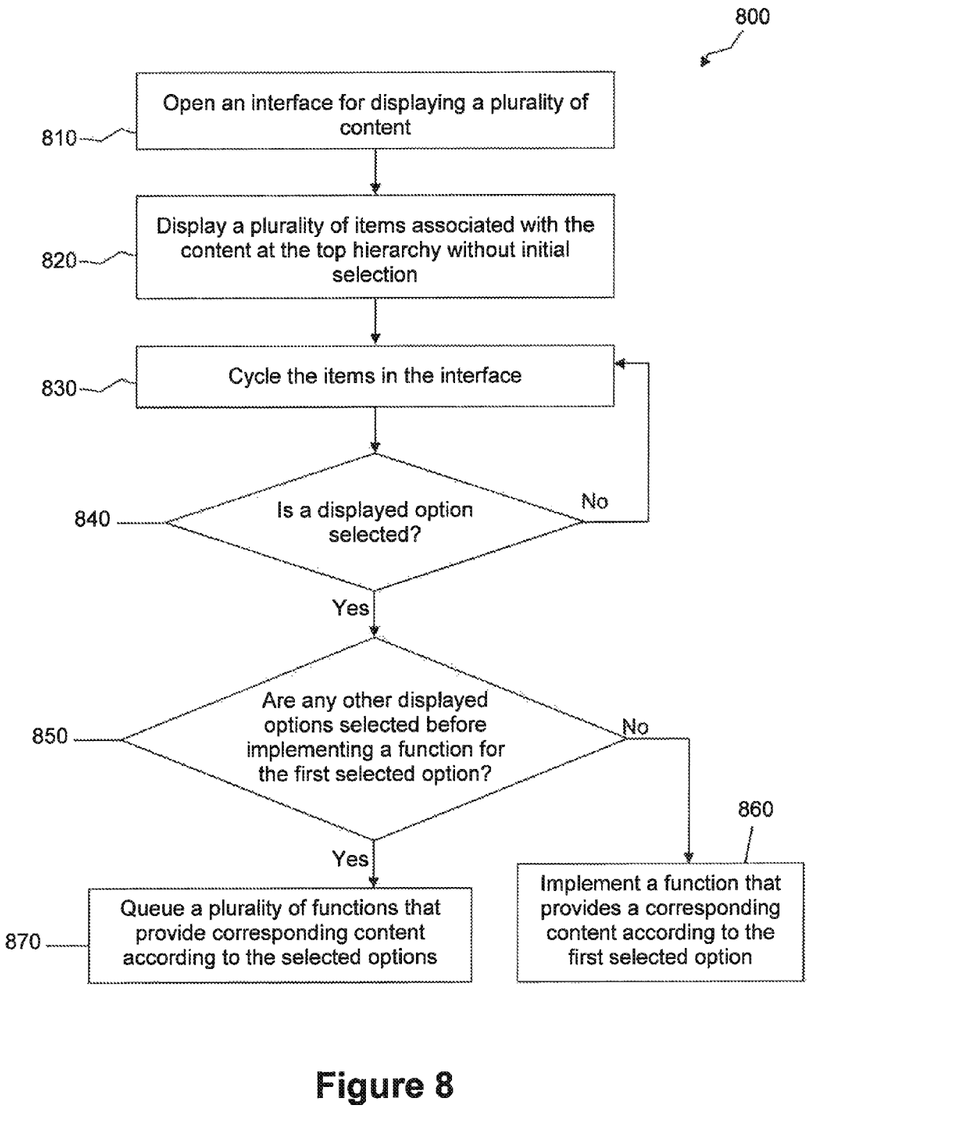
FIG. 8 is a flowchart of a method for displaying/providing media content in a filmstrip of according to an implementation of the disclosure.

FIG. 8 illustrates an implementation of a method 200 for displaying/providing content in a filmstrip format (or other format) on the UE 110. At block 810, an interface for displaying a plurality of content may be opened or activated. For example, a user of the UE 120 may open an application that launches the interface 200. The displayed content may stored on the UE 120 and/or accessed remotely from the UE 120.

At block 820, a plurality of items associated with the content at the top hierarchy may be displayed without initial selection. For example, the items 222 associated with the content in a specific hierarchy or folder may be initially displayed in the filmstrip view 220. The content may be collected randomly or in some order for display from the top hierarchy or interface.

At block 830, the items 222 may be cycled through. For example, the items 222 may be rolled in the filmstrip 220 over time to allow the user to view more choices than might otherwise be shown at one time on the screen. At block 840, the method 800 may determine whether a displayed option is selected. The option may correspond to any of the options above or other possible options and may be displayed in or associated with one or more of the items 222. If the condition in block 840 is met, then the method 800 may proceed to block 850. Otherwise, the method 800 may return to block 830 to continue cycling the items in the interface.

At block 850, the method 800 may determine whether any other displayed options are selected before implementing a function for the first selected option. The other options may be selected after selecting the first option. If other options are not selected, e.g. before implementing the function for the first selected option, the method 800 may proceed to block 860 to process the first selected option. Otherwise, the method 800 may proceed to block 870 to process all the selected options.

At block 860, a function that provides a corresponding content according to the first selected option is implemented. For instance, the content may be streamed, purchased, downloaded, played, or rated according to the selected option. At block 870, a plurality of functions that provide corresponding content according to the selected options are queued. Each queued function may then be implemented in sequence as queued.

Figure 9:
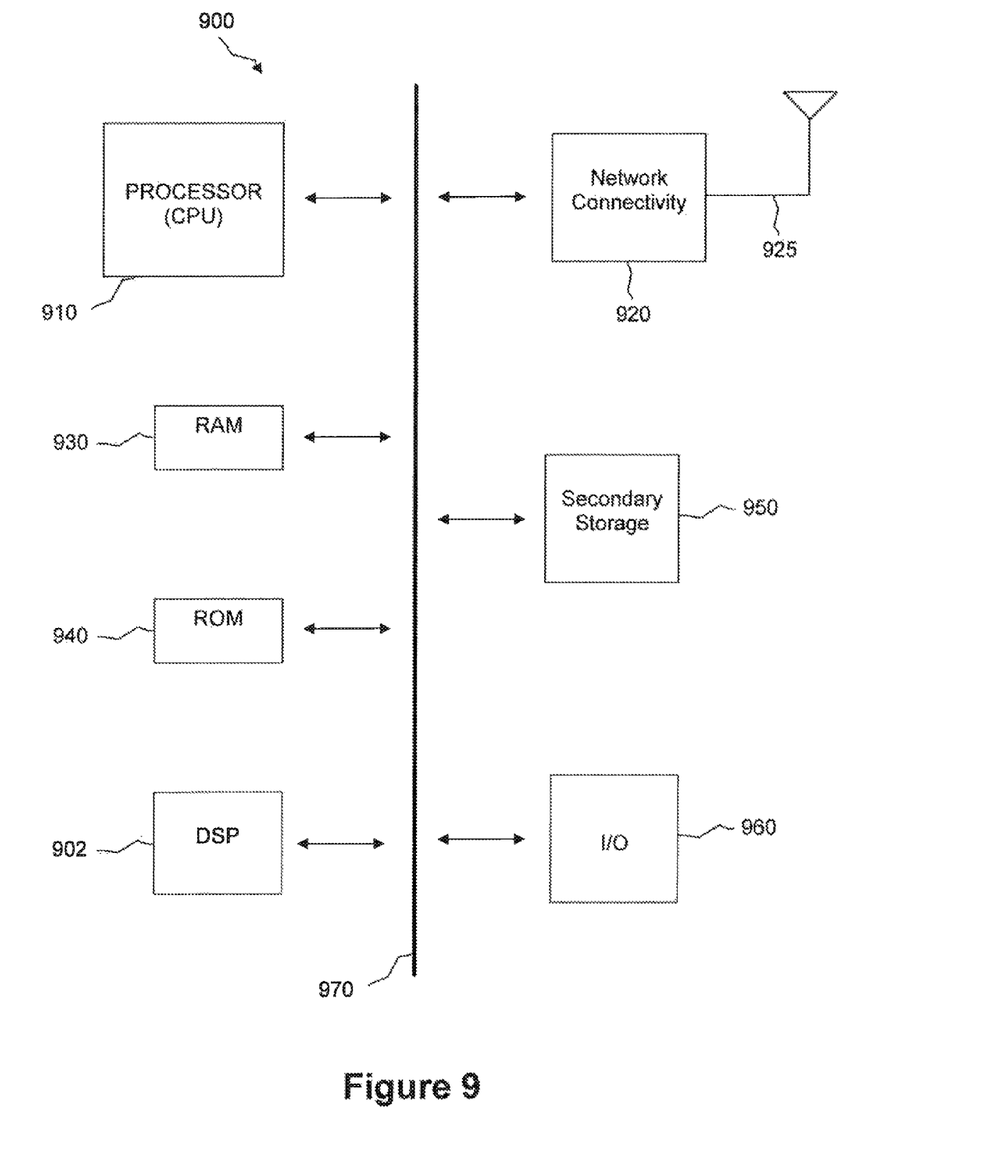
FIG. 9 illustrates a processor and related components suitable for implementing the several implementations of the present disclosure.

The UE 120 and other components described above might include a processing component that is capable of executing instructions related to the actions described above. FIG. 9 illustrates an example of a system 900 that includes a processing component 910 suitable for implementing one or more implementations disclosed herein. In addition to the processor 910 (which may be referred to as a central processor unit or CPU), the system 900 might include network connectivity devices 920, random access memory (RAM) 930, read only memory (ROM) 940, secondary storage 950, and input/output (I/O) devices 960. These components might communicate with one another via a bus 970. In some cases, some of these components may not be present or may be combined in various combinations with one another or with other components not shown. These components might be located in a single physical entity or in more than one physical entity. Any actions described herein as being taken by the processor 910 might be taken by the processor 910 alone or by the processor 910 in conjunction with one or more components shown or not shown in the drawing, such as a digital signal processor (DSP) 902. Although the DSP 902 is shown as a separate component, the DSP 902 might be incorporated into the processor 910.

The processor 910 executes instructions, codes, computer programs, or scripts that it might access from the network connectivity devices 920, RAM 930, ROM 940, or secondary storage 950 (which might include various disk-based systems such as hard disk, floppy disk, or optical disk). While only one CPU 910 is shown, multiple processors may be present. Thus, while instructions may be discussed as being executed by a processor, the instructions may be executed simultaneously, serially, or otherwise by one or multiple processors. The processor 910 may be implemented as one or more CPU chips.

The network connectivity devices 920 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (COMA) devices, GSM radio transceiver devices, worldwide interoperability for microwave access (WiMAX) devices, and/or other well-known devices for connecting to networks. These network connectivity devices 920 may enable the processor 910 to communicate with the Internet or one or more telecommunications networks or other networks from which the processor 910 might receive information or to which the processor 910 might output information. The network connectivity devices 920 might also include one or more transceiver components 925 capable of transmitting and/or receiving data wirelessly.

The RAM 930 might be used to store volatile data and perhaps to store instructions that are executed by the processor 910. The ROM 940 is a non-volatile memory device that typically has a smaller memory capacity than the memory capacity of the secondary storage 950. ROM 940 might be used to store instructions and perhaps data that are read during execution of the instructions. Access to both RAM 930 and ROM 940 is typically faster than to secondary storage 950. The secondary storage 950 is typically comprised of one or more disk drives or tape drives and might be used for non-volatile storage of data or as an over-flow data storage device if RAM 930 is not large enough to hold all working data. Secondary storage 950 may be used to store programs that are loaded into RAM 930 when such programs are selected for execution.

The I/O devices 960 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 925 might be considered to be a component of the I/O devices 960 instead of or in addition to being a component of the network connectivity devices 920.

Various combinations of the components of the system 900, including memory, hardware, firmware, software or others may be referred to herein as a "component".

In one implementation, a user equipment and method are provided for displaying items associated with selected media content and to cycle such that multiple items are displayed over time.

In another implementation, a UE is provided that includes at least one component configured to display a plurality of items provided in a filmstrip format and associated with a plurality of content and to cycle the items in the filmstrip format. A method therefore is also contemplated.

While several implementations have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic device, comprising:
   a display configured to render a first view and a second view; and
   a component configured to display items associated with selected media content and to cycle such that multiple items are displayed over time in the second view of the display, the component further configured such that when hierarchies displayed in the first view are selected, items associated with the selected hierarchies are displayed over the second view, and when items displayed in the second view are selected, information associated with the selected items is displayed over the first view, wherein the first view is at least partially viewable when information associated with items selected from the second view is displayed over the first view.

2. The electronic device of claim 1, wherein media content is automatically selected from one of either a top level hierarchy or a plurality of hierarchies.

3. The electronic device of claim 1, wherein items are displayed based on the random selection of the associated media content from media content stored on the electronic device or accessible by the electronic device.

4. The electronic device of claim 1, wherein items are displayed based on hierarchies selected via an interface on the electronic device.

5. The electronic device of claim 1, wherein the content is stored on at least one of the electronic device, a remote storage medium coupled to the electronic device, and a network component in communications with the electronic device.

6. The electronic device of claim 1, wherein the items are displayed in a filmstrip format displayed one of either vertically, horizontally, or diagonally, and wherein as the filmstrip rolls the items are cycled.

7. The electronic device of claim 1, wherein at least one of the items provides an option for accessing the associated media content.

8. The electronic device of claim 1, wherein at least one of the items displayed in the second view is selectable to provide additional information related to the associated media content.

9. The electronic device of claim 1, wherein at least one of the items provides an option for one of downloading, streaming, playing, rating, or purchasing the associated media content.

10. The electronic device of claim 1, wherein the items are displayed in a pop-up window or a fade-in/out window, and wherein the items are cycled with the display of each new window.

11. The electronic device of claim 1, wherein the items are one of icons, text, or images, and wherein the media content is one of music, videos, advertisements, or applications.

12. The electronic device of claim 1, wherein the display of the cycled items is initiated automatically without input.

13. A method implemented in an electronic device, the method comprising:
    displaying items associated with selected media content on a display of the electronic device, the display configured to render a first view and a second view; and
    cycling the items such that multiple items are displayed over time in the second view of the display,
    when hierarchies displayed in the first view are selected, items associated with the selected hierarchies are displayed over the second view, and when items displayed in the second view are selected, information associated with the selected items is displayed over the first view, wherein the first view is at least partially viewable when information associated with items selected from the second view is displayed over the first view.

14. The method of claim 13, wherein media content is automatically selected from one of a top level hierarchy or a plurality of hierarchies.

15. The method of claim 13, wherein items are displayed based on the random selection of the associated media content from media content stored on the electronic device or accessible by the electronic device.

16. The method of claim 13, wherein the content is stored on at least one of the electronic device, a remote storage medium coupled to the electronic device, and a network component in communications with the electronic device.

17. The method of claim 13, wherein the items are displayed in a filmstrip format displayed one of either vertically, horizontally, or diagonally, and wherein as the filmstrip rolls the items are cycled.

18. The method of claim 13, wherein at least one of the items provides an option for accessing the associated media content.

19. The method of claim 13, wherein at least one of the items displayed in the second view is selectable to provide additional information related to the associated media content.

20. The method of claim 13, wherein at least one of the items provides an option for one of downloading, streaming, playing, rating, or purchasing the associated media content.

21. The method of claim 13, wherein the items are displayed in a pop-up window or a fade-in/out window, and wherein the items are cycled with the display of each new window.

22. The method of claim 13, wherein the items are one of icons, text, or images, and wherein the media content is one of music, videos, advertisements, or applications.

23. The method of claim 13, wherein the display of the cycled items occurs automatically from a home screen view without input.

24. An electronic device, comprising:
    a display configured to render a first view and a second view; and
    at least one component configured to display a plurality of items provided in a filmstrip format and associated with a plurality of content and to cycle the items in the filmstrip format in the second view of the display,
    the at least one component further configured such that when hierarchies displayed in the first view are selected, items associated with the selected hierarchies are displayed over the second view, and when items displayed in the second view are selected, information associated with the selected items is displayed over the first view, wherein the first view is at least partially viewable when information associated with items selected from the second view is displayed over the first view.

25. The electronic device of claim 24, wherein the items are cycled in the filmstrip format until one of the items is selected.

26. The electronic device of claim 24, wherein the items are displayed in a reoccurring sequence in the filmstrip format.

27. The electronic device of claim 24, wherein the content is determined based on a selection by a user.

* * * * *